United States Patent [19]

Durlach et al.

[11] Patent Number: 5,828,997
[45] Date of Patent: Oct. 27, 1998

[54] CONTENT ANALYZER MIXING INVERSE-DIRECTION-PROBABILITY-WEIGHTED NOISE TO INPUT SIGNAL

[75] Inventors: Nathaniel I. Durlach, Weston; Robert A. Berkovitz, Brookline, both of Mass.

[73] Assignee: Sensimetrics Corporation, Cambridge, Mass.

[21] Appl. No.: 485,368

[22] Filed: Jun. 7, 1995

[51] Int. Cl.$^6$ .............................. G10L 5/06; G01S 3/80
[52] U.S. Cl. ............................ 704/233; 367/124
[58] Field of Search .................... 367/124, 125, 367/126, 129; 342/92; 704/233

[56] References Cited

U.S. PATENT DOCUMENTS

| | | | |
|---|---|---|---|
| 4,485,484 | 11/1984 | Flanagan | 381/92 |
| 4,534,056 | 8/1985 | Feilchenfeld et al. | 704/273 |
| 4,581,758 | 4/1986 | Coker et al. | 381/56 |
| 4,618,983 | 10/1986 | Nishioka et al. | 704/239 |
| 4,783,803 | 11/1988 | Baker et al. | 704/252 |
| 4,933,973 | 6/1990 | Porter | 704/233 |
| 5,214,707 | 5/1993 | Fujimoto et al. | 704/275 |
| 5,222,146 | 6/1993 | Bahl et al. | 704/243 |
| 5,335,011 | 8/1994 | Addeo et al. | 348/15 |
| 5,465,302 | 11/1995 | Lazzari et al. | 381/92 |
| 5,566,272 | 10/1996 | Brems et al. | 704/231 |

FOREIGN PATENT DOCUMENTS

| | | |
|---|---|---|
| 608708 | 8/1994 | European Pat. Off. . |
| 4141562 | 6/1993 | Germany . |
| 58-106667 | 6/1983 | Japan . |

OTHER PUBLICATIONS

Yves Grenier, "A Microphone Array for Car Environments", Proceedings of IEEE ICASSP '92, pp. I.305–I.308., Mar. 1992.

Stephen Oh, Vishu Viswanathan, and Panos Papamichalis, "Hands–Free Voice Communication in an Automobile With a Microphone Array", Proceedings of IEEE ICASSP '92, pp. I.281–I.284., Mar. 1992.

Qiguang Lin, Ea–Ee Jan, and James Flanagan, "Microphone Arrays and Speaker Identification", IEEE Trans. Speech and Audio Processing, pp. 622–629., Oct. 1994.

Walter Kellerman, "A Self–Steering Digital Microphone Array", Proceedings of IEEE ICASSP '92, pp.3581–3584., Apr. 1991.

Ming Zhang and M. H. Er, "A New Method of Tracking Talker Location for Microphone Arrays in Near Field", IEEE ASSP Workshop on Applications of Signal Processing to Audio and Acoustics, pp. 177–180., Oct. 1995.

Ming Zhang and M. H. Er, "Tracking Direction of Speaker for Microphone Array in the Far Field", Proceedings of the IEEE Singapore International Conference on Networks/Information Engineering, pp. 541–544., Jul. 1995.

D. Giuliani, M. Matassoni, M. Omologo, and P. Svaizer, "Hands–Free Continuous Speech Recognition in Noisy Environment Using a Four–Microphone Array", Proceedings of IEEE ICASSP '95, pp. 860–863., May 1995.

(List continued on next page.)

*Primary Examiner*—David R. Hudspeth
*Assistant Examiner*—Tālivaldis Ivars Šmits
*Attorney, Agent, or Firm*—Hale and Dorr LLP

[57] ABSTRACT

A speech recognition system combines content analysis of a signal with directional analysis of the signal to calculate probable contents of the signal and the probability that the contents are as calculated. Content analysis can be combined with independent source direction analysis, consisting of the probable direction of the source and the probability that the source is as determined, to refine the content analysis. The direction analysis can affect either the calculation of the probable contents of the signal or the calculation of the probability that the contents are as calculated. The improved information obtained by combining the content analysis with directional analysis can be used to improve subsequent content analyses or directional analyses.

4 Claims, 1 Drawing Sheet

OTHER PUBLICATIONS

K. Farrell, R. J. Mammone, and J. L. Flanagan, "Beamforming Microphone Arrays for Speech Enhancement", Proceedings of IEEE ICASSP '92, pp. I.285–I.288., Mar. 1992.

Sven Nordholm, Ingvar Claesson, and Bengt Bengtsson, "Adaptive Array Noise Suppression of Handsfree Speaker Input in Cars", IEEE Transactions on Vehicular Technology, pp.514–518., Nov. 1993.

Lawrence Rabiner and Biing–Hwang Juang, Fundamentals of Speech Recognition, Prentice–Hall, pp.52–53., 1993.

Switzer et al, "A customized Beamformer System for Acquisition of Speech Signals," Proc. of Asilomar Conference on Signals, Systems & Computers, Nov. 4–6, 1991, vol. 1 of 2, pp. 339–343.

Huang, "A Biomimetic System for Localization and Separation of Multiple Sound Sources," IEEE Transactions on Instrumentation and Measurement, Jun. 1995, No. 3, pp. 733–738.

CONTENT ANALYZER MIXING INVERSE-DIRECTION-PROBABILITY-WEIGHTED NOISE TO INPUT SIGNAL

FIELD OF THE INVENTION

This invention relates to the recognition of intelligent information in signals. More particularly, it relates to speech recognition in environments that contain interference.

BACKGROUND OF THE INVENTION

Automatic speech recognition systems typically perform poorly when operating in noisy environments, where they must distinguish between speech ("target") signals and noise (interference). If the acceptance criteria are adjusted so that a high proportion of target signals are accepted, then many of the interfering noise signals are also accepted. Consequently, the false-alarm rate is high. On the other hand, if the acceptance criteria are adjusted to achieve a low false-alarm rate, then many target signals are rejected. Consequently, the target acceptance rate is low. Thus, no matter how the acceptance criteria are selected, performance is degraded by the presence of the interference.

Prior art attempts to solve this problem have been based on increasing the ratio of target signal power to interference signal power. This is accomplished typically by use of one or more of the following three methods. First, input signals can be filtered to attenuate frequencies not contained in the spectra of the target signals. Although generally helpful, this method is unsatisfactory in noisy environments.

Second, the microphones can be located close to the source of the target signals to increase the relative strength of these signals. This method is useful only under limited conditions. It is not effective if the target signal moves or if there are a number of target sources at different locations. Even for a single, fixed source, this method may be unacceptable. For example, the target source may be a person who does not wish to wear a microphone headset. Or, it may be desired that the target not be aware of the signal acquisition system.

A third method is to employ a microphone system that is highly directional, oriented so that it is most sensitive in the direction of the target signals. However, this method requires multiple microphones, placed at different locations. This requires the use of a substantial amount of space, particularly if the system is to be highly directional at low frequencies. Also, movement of the target source in such a system will degrade performance of the speech recognition system because the directional pattern of the microphones causes the spectrum of the received signal to vary with respect to the position of the target. As a result, movement of the target source causes changes in the received signal that cannot be distinguished from changes in the target signal. This distortion of the received signal occurs even in the absence of noise.

It is therefore an object of the present invention to provide an improved speech recognition system.

It is another object of the present invention to provide a speech recognition system with improved performance in environments that contain interference.

It is a further object of the present invention to provide a speech recognition system with improved performance in environments where the target source moves.

SUMMARY OF THE INVENTION

According to the present invention, these and other objects and advantages are achieved by employing a diversified microphone system to obtain information on the direction of the target sound source (a "directional signature"). This directional information is combined with the content information on which automatic speech recognition is customarily based.

The system employs two subsystems. The first includes a microphone system and associated signal processing to determine the direction (in terms of the angular coordinates, $\theta$ and $\Phi$) of the sound source. The second combines this directional information with the content information to determine whether the received signal should be accepted as a target signal or rejected as interference. The directional information provided by the first subsystem can be used to exclude interfering signals arising from non-target directions with a low probability that desired target signals will be excluded. The directional information also permits acceptance of signals for which the content is less certain as long as such signals are very likely to come from a target source.

BRIEF DESCRIPTION OF THE INVENTION

The present invention is for an apparatus and method for speech recognition using spatial information to reduce the effects of interference.

Figure 1:
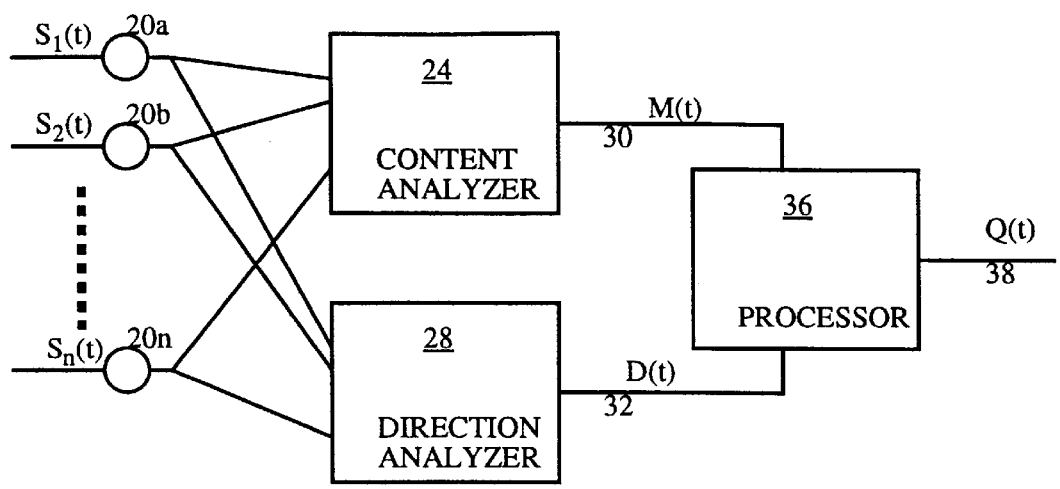
FIG. 1 is a block diagram of a first embodiment of the speech recognition system of the present invention.

Referring to FIG. 1, time-varying signals $S_1(t)$–$S_n(t)$ are input to microphones $20a$–$20n$. Preferably, microphones $20a$–$20n$ are omnidirectional microphones or have a wide acceptance angle. These signals are then transmitted to content analyzer 24 and source direction analyzer 28.

Content analyzer 24 is a conventional speech recognition subsystem, which can include dedicated hardware or a specially programmed computer, as is well known in the art. For example, the "Dragon Dictate" system by Dragon Systems of Newton, Mass. suitable for the systems of the present invention. Content analyzer 24 provides an output M(t), on line 30. M(t) is the estimated most probable message, along with a measure of the associated probability or confidence rating. M(t) may represent the utterances judged to be the most likely to have been transmitted out of the set of utterances in the system's vocabulary. In a preferred embodiment, M(t) at each time interval consists of a series of utterances and probabilities $[(M_1, m_1), (M_2, m_2), \ldots (M_k, m_k)]$ in order of decreasing probability or confidence, where the $M_i$ are the utterances and the $m_i$ are the corresponding probabilities, where $m_1 \geq m_2 \geq \ldots \geq m_k$ and $0 \leq m_i \leq 1$ for all i.

The probability or confidence level associated with the accuracy of the identification of an utterance (the M(t) function) is normally derived from an evaluation of the dissimilarity of two feature vectors. This technique is well known in the art and its application is described in the book *Fundamentals of Speech Recognition*, by L. Rabiner and B. H. Juang (Prentice-Hall, 1993).

Source direction analyzer 28 provides an output D(t) on line 32. Where t here is assumed to be only one source target signal, D(t) is the estimated most probable source direction $(\theta, \Phi)$, along with a measure of the associated probability or confidence. In a preferred embodiment, D(t) at each time interval consists of a series of source directions and probabilities $[(D_1, d_1), (D_2, d_2), \ldots (D_k, d_k)]$ in order of decreasing probability or confidence, where the $D_i$ are the source directions and the $d_i$ are the corresponding probabilities, where $d_1 \geq d_2 \geq \ldots \geq d_k$ and $0 \leq d_i \leq 1$ for all i. Where there may be multiple target sources, each item in the series could include multiple source locations.

The source direction where there is only one source location active at any one time can be determined for one angular dimension θ by using two microphones, which have inputs $S_1$ and $S_2$. In a preferred embodiment, $S_1(t)$ will be found to be attenuated and delayed with respect to $S_2(t)$, or vice versa. Values of α and τ are determined to minimize the difference signal, $Z(t)=S_2(t)-\alpha S_1(t-\tau)$. In the absence of noise, values for α and τ can be selected for which $Z(t)$ will be zero for all times t.

This can be accomplished, for example, with an array of delay lines, where each delay line represents a different delay (τ) to the signal $S_1(t)$, and an array of attenuation lines, where each attenuation line represents a different attenuation (α) of the same signal, $S_1(t)$. A matrix is formed, consisting of each combination of a delay and an attenuation of the signal $S_1(t)$ (i.e., $\alpha S_1(t-\tau)$, for different values of α and τ). Each combination is compared to the other signal, $S_2(t)$. The comparison that yields the smallest difference between the signals (i.e., the minimum value for $Z(t)$) determines the appropriate values for α and τ. The conditions under which the system will be used will determine the appropriate number of delay and attenuation lines needed to obtain sufficient accuracy in the determination of α and τ.

The direction of the source is then determined by converting (α, τ) to θ, as is well known in the art. This method can be applied where n source locations may be active at a given time by employing n+1 microphones and determining values for $\alpha_1$–$\alpha_n$ and $\tau_1$–$\tau_n$ to minimize $Z(t)$ for all times t.

Alternatively, the source direction can be determined without the use of delay lines by measuring the delay τ between signal onsets in the two channels and using a comparator to determine the difference in amplitude of the signal onsets; by using microphones with different directional patterns and measuring the amplitude difference in the two channels; by measuring the correlation coefficient between the two channels after first whitening the spectra of the signals; or by other methods known in the art. These methods also can be applied where more than one source location may be active at a given time.

The outputs M(t) on line 30 and D(t) on line 32 are input to and processed in processor 36. The signals M(t) consist of pairs $[(M_1, m_1), (M_2, m_2), \ldots (M_k, m_k)]$ for each time segment. The probability m that the received signal arises from one of the utterances $M_i$ can be represented by:

$$m = \sum_{i=1}^{k} m_i$$

and the probability that the received signal does not arise from one of the utterances $M_i$ is given by $m^* = 1-m$.

Where there is a single signal source, the directional information D(t) can be represented by the total probability d that the source is a target source. That is, having determined the direction, the source direction analyzer 28 provides a probability d that the source is a target. The probability d is independent of the content information M for the current utterance. In this situation, the output Q(t) of processor 36, on line 38, is the set of pairs $[(M_1, q_1), (M_2, q_2), \ldots (M_k, q_k)]$ for each time segment, where $q_i = m_i d$. Thus, by combining the directional information D(t) with the content information M(t), the probability of the signal resulting from target message $M_i$ is mid instead of $m_i$. The probability of the signal resulting from some target message is:

$$m' = d \sum_{i=1}^{k} m_i = dm = d(1 - m^*)$$

and the probability of the signal not resulting from some target message is given by $m'^* = 1-dm$.

As shown, the addition of the directional information D(t) decreases the probability that any signal will be regarded as a target message because probabilities based on both content and direction are considered. However, this effect can be offset by lowering the numerical threshold of acceptance of an utterance, a quantity that is or can readily be made accessible to the user in the software of speech recognition systems.

Numerous methods may be employed to determine the probability that the source is a target source from the directional information D(t). In a first method, a priori information on the position of the target source is utilized. In one embodiment, the system would assume that the mean target position is straight ahead (θ=0), so that d=1 for θ=0, and that the probability of the target being at any other angle decreases exponentially with angle (that is, $d=e^{-g\theta}$, where g is a constant).

In a second method, d(θ) is constructed during training of the recognition system. For example, where the system is trained in a quiet environment, a histogram of target values θ is accumulated and used to determine the function d(θ). In a preferred embodiment using this method, the distribution of θ for interference also is estimated during training and included in the function d(θ).

The probability measure associated with the source direction also can incorporate the message content information M(t) during real-time use of the system. In a third method, the message content information is used indirectly, with the probability derived from a histogram record of directions associated with the source for previous utterances recognized by the speech recognition system. For example, a record may be maintained of the azimuth (θ) associated with each of the last 40 utterances meeting minimum probabilities. The distribution of the azimuths forms a probability density function. Then, for example, if the measured direction of the source for the most recent utterance has been associated with 25% of the 40 utterances for which records are maintained, a probability or confidence level of 0.25 would be assigned to that azimuth value.

The histogram—that is, the record of measured directions and counts—is continually updated as new utterances are accepted by the system and the data for the oldest utterances is dropped. Consequently, the histogram changes in a manner that adapts to changes in the position of the source. For example, if a number of recent utterances arise from azimuth angles to the night of the centroid of the probability density function, which would correspond to movement of the source to the right, the adaptive process causes the centroid to shift to the right.

The probability determination can be modified by adding a weighting function based on the age of each of the records (e.g., give more weight to the most recent records) or some other factor appropriate to known characteristics of the source. Preferably, the weighting function is derived from prior knowledge of the probable locations and movements of the source. This prior knowledge can be based, for example, on physical constraints such as the location of the speaker's chair, or on information obtained during the phonetic training period normally required by a speech recognition system so that it can take into account the individual characteristics, including a pattern of movement, of the speaker.

In a fourth method, $d(\theta)$ is constructed by directly exploiting the message content information $M(t)$ during real-time use of the system. For example, for each received signal, the source direction angle $\theta$ and probability m that the received signal arises from one of the utterances is used to develop a histogram for acceptable source direction angles $\theta$. The histogram is a representation of a list of ordered pairs $(\theta_i, m_i)$ in which each pair consists of an angle and a probability, and in which totals have been sorted by $\theta$. Since the histogram is derived from actual data, it can be used to replace a gaussian or other nominal statistical distribution.

The histogram is used to form $d(\theta)$, which processor 36 in turn uses to obtain the output $Q(t)$. Preferably, this modified content information $Q(t)$ is fed back to source direction analyzer 28 to improve the directional information. For example, the modified content information $Q(t)$ can be used to modify the directional probability function, $d(\theta)$. This method can be used where initial values for $d(\theta)$ are formed from a different method. The modified content information $Q(t)$ also can be fed back to content analyzer 24 to improve the initial message content information $M(t)$. For example, the modified content information $Q(t)$ can be used to modify the utterance probability function.

In addition to improving the message content information $M(t)$, the directional information can be used to permit the voice recognition system to distinguish between sources as long as the sources generally do not overlap. For example, where there are two sources that generally do not overlap, there would be two direction functions $d_1(\theta)$ and $d_2(\theta)$, for which there generally are no angles $\theta$ for which both $d_1(\theta)$ and $d_2(\theta)$ are large. With these functions, the system could determine which source supplied an utterance. Or, the determination of the most probable message could depend on the direction.

Alternatively, the directional information can be integrated with the content information in other ways. In one embodiment, the estimated direction $\theta$ is coded into a signal $N(t)$, which is appended to the signals $S_i(t)$ at the input to content analyzer 24. Preferably, directional segment $N(t)$ is attached as soon as the directional information is available, as an interruption or a change in the utterance waveform. This transforms the directional information into content information, and the signal is processed without the need for processor 36 to combine directional information with the processed content information. That is, all of the content processing takes place in content analyzer 24.

In one embodiment, direction signal $N(t)$ is appended as a suffix to the signals $S_i(t)$. Whenever the angle $\theta$ is outside a previously defined range of acceptable angles, the value of $N(t)$ is such that content analyzer 24 will reject the signal as not corresponding to a recognized utterance within the system's vocabulary.

Figure 2:
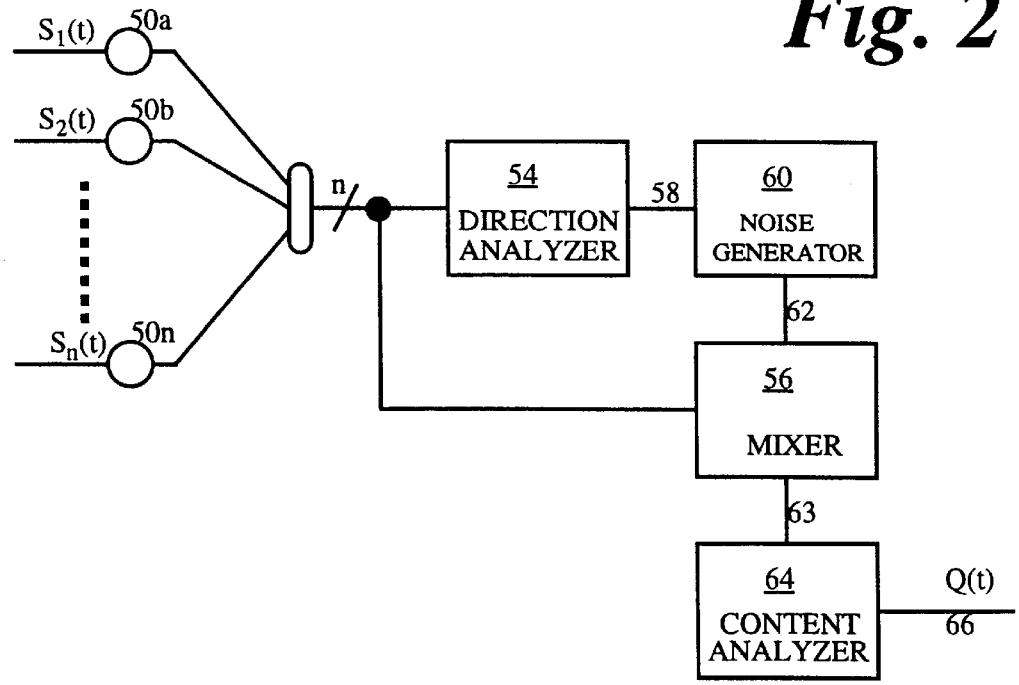
FIG. 2 is a block diagram of a second embodiment of the speech recognition system of the present invention.

An alternative embodiment for integrating the directional information with the content information is shown in FIG. 2. Time-varying signals $S_1(t)$–$S_n(t)$ are input to microphones 50a–50n. These signals are then transmitted to direction analyzer 54 and mixer 56. Direction analyzer 54 provides an output on line 58, in the manner described above, that reflects the probability that the source signals originate with a desired target source. Line 58 provides the input to noise generator 60, which generates an amount of noise inversely proportional to the probability that the source signals originate with the desired target source. That is, the noise level increases as the probability that the signal arises from the desired target source decreases.

The noise signal is output on line 62, which connects to mixer 56. In mixer 56, the signals $S_1(t)$–$S_n(t)$ are mixed with the noise signal from noise generator 60, and then input to content analyzer 64. Content analyzer 64 outputs message information $Q(t)$ on line 66. An increase in the noise on the signal input to content analyzer 64 decreases the likelihood that the utterance will be recognized and/or the confidence level in the accuracy of the utterance determination. Thus, represented as noise, the direction information imposes a constraint on the content analyzing portion of the system.

In a simplified version of the embodiment shown in FIG. 2, the direction information would be used to either include or exclude the source signals $S_1(t)$–$S_n(t)$. In this embodiment, the directional information is used independently of the content information. If the probability that the signal originated with a desired target fell below a predetermined threshold, the system would reject the signal. If the probability exceeded the threshold, the signal would be input to the content analyzer unchanged.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

What is claimed is:

1. A recognition system for a source signal comprising:

input means for obtaining at least one input signal for the source signal;

a direction analyzer having a direction input coupled to the input means, a direction output, and a direction processor for calculating a probability that the source signal originates from one of at least one predetermined direction and providing to the direction output a direction probability signal representative of the probability;

a noise generator having an input coupled to the direction output and a noise output, for providing a noise signal inversely proportional to the probability;

a mixer having a first mixer input coupled to the input means, a second mixer input coupled to the noise output, and a mixer output, for combining signals on the first mixer input and the second mixer input; and a content analyzer having a content input coupled to the mixer output, a content output, and a content processor for calculating and providing to the content output a content signal representative of a calculated value of the source signal.

2. The recognition system as in claim 1, wherein the content processor further calculates and provides to the content output a content probability signal representative of a confidence level in the calculated value of the source signal.

3. The recognition system as in claim 2, wherein the input means includes at least one microphone.

4. A method for converting a source signal to a symbolic signal comprising the steps of:

obtaining at least one input signal from the source signal;

calculating a probability that the source signal originates from one of at least one predetermined directions;

generating a noise signal inversely proportional to the calculated probability;

mixing the at least one input signal with the generated noise signal; and generating from the mixed signal a content signal representative of a probable value of the source signal.

* * * * *